No. 759,406. PATENTED MAY 10, 1904.
A. TISSIER.
PROCESS OF PRODUCING GAS CONDENSING BODIES.
APPLICATION FILED NOV. 30, 1900.
NO MODEL.
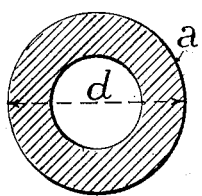
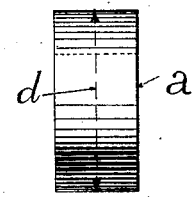
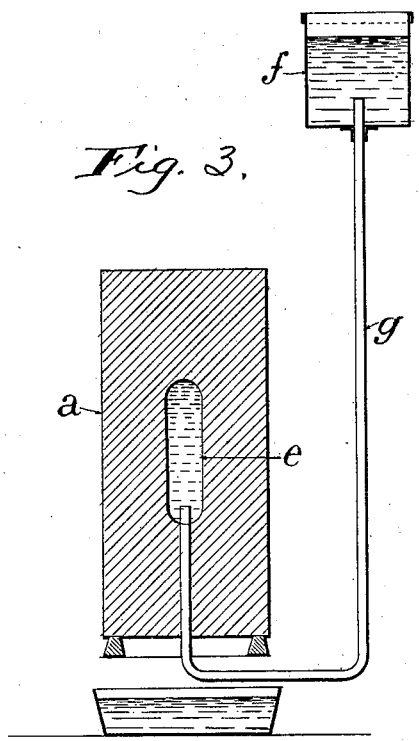

No. 759,406.      Patented May 10, 1904.

UNITED STATES PATENT OFFICE.

ALBERT TISSIER, OF PARIS, FRANCE.

PROCESS OF PRODUCING GAS-CONDENSING BODIES.

SPECIFICATION forming part of Letters Patent No. 759,406, dated May 10, 1904.

Application filed November 30, 1900. Serial No. 38,231. (No specimens.)

*To all whom it may concern:*

Be it known that I, ALBERT TISSIER, a citizen of the Republic of France, residing at Paris, France, have invented certain new and useful Improvements in Processes of Producing Gas-Condensing Bodies, (for which I have made application in France, No. 292,723, dated October 10, 1900; in Belgium, No. 120,707, dated October 10, 1900; in Great Britain, No. 18,035, dated October 10, 1900; in Spain, No. 729, dated October 11, 1900, and in Italy, No. 15,829, dated October 11, 1900,) of which the following is a specification.

The present invention relates to the treatment by heat at almost 2,000° centigrade of a natural mineral of feldspar origin, mineralogically composed of light particles of quartz, the form of small rods or funicular tubes, while chemically it is composed of approximately 78.80 per cent. of silica, 1.44 of iron oxid, 6.96 of alumina, and 4.32 of magnesia. This mineral is reduced to a fine powder, mixed with a small quantity of water to form a paste, from which bricks, cylinders, disks, or blocks of any suitable shape are formed, such blocks being afterward dried in the open or in a stove or drying device and finally heated at a temperature of from 1,600° to 2,000° centigrade. This baking is intended to bind the particles and to develop the property of porosity inherent in the material, whereby the product is rendered capable of replacing platinum sponge as a condenser of the gases and to induce the chemical combinations of such gases.

In the drawings, in Figure 1 I illustrate an end view of a ring formed from the baked material. Fig. 2 indicates a face view thereof; Fig. 3, a vertical sectional view showing a block of the baked material connected by a pipe with a reservoir containing a hydrocarbon.

If of such material thus baked rings $a$ are made the diameter $d$ of which is equal to that of the smoke-conduit of a vapor-generator and such rings being arranged at suitable places along such smoke-conduit, it will be possible to obtain from the same quantity of fuel spread out in the furnace a much higher caloric yield than otherwise, for these rings will absorb the combustible gases (forming part of or carried off with the products of combustion) and also the carbureting gases as they pass along, and thereby induce them to combine. The same effect will be obtained by providing the passages through which the combustion gases travel with walls or baffles, or both, made of bricks or blocks of the material referred to above. Such mineral will absorb hydrocarbons even very rich in carbon, so that when placed on the grate of an ordinary furnace after having been first drained it will allow the complete combustion of the hydrocarbon without any smoke.

If desired, a chamber $e$ may be made in a block of the baked porous refractory mineral and connected, say, by a pipe $g$ with a reservoir $f$, containing a hydrocarbon, whereby a continuous combustion of the hydrocarbon can be effected without smoke. Finally by passing through such porous baked bodies a hydrocarbon and air a mixture of carbureted air is formed which can be employed for the purpose of heating, of producing motor force, or even of lighting.

The mineral described in this application is to be found, among other places, in the quarries at Antigony le Tillar par les Ormes in the Department of Indre-et-Loire, France.

What I claim as my invention, and desire to secure by Letters Patent, is—

The herein-described mode of manufacturing a gas-condensing body for use as described, which consists in reducing to a powder a natural quartz mineral of the character set forth composed approximately of 78.80 per cent. of silica, 1.44 of iron oxid, 6.96 of alumina and 4.32 of magnesia, then adding water to the mass, shaping the mixture into bodies of desired form and then subjecting the said bodies to a temperature of about 2,000° centigrade whereby to bind the particles and develop the porosity of the bodies.

In testimony whereof I have signed my name to this specification in the presence of two subscribing witnesses.

ALBERT TISSIER.

Witnesses:
ALBERT MAULVAULT,
EDWARD P. MACLEAN.